United States Patent [19]

Martin-Lopez et al.

[11] Patent Number: 5,335,162
[45] Date of Patent: Aug. 2, 1994

[54] PRIMARY SIDE CONTROLLER FOR REGULATED POWER CONVERTERS

[75] Inventors: Fernando R. Martin-Lopez, Colorado Springs, Colo.; Richard Redl, Onnens, Switzerland

[73] Assignee: Toko America, Inc., Mount Prospect, Ill.

[21] Appl. No.: 4,934

[22] Filed: Jan. 15, 1993

[51] Int. Cl.⁵ ............................................. H02M 1/08
[52] U.S. Cl. ...................................... 363/97; 363/95; 323/284; 323/285; 323/288
[58] Field of Search ............... 323/222, 282, 283, 284, 323/285, 288, 351; 363/21, 95, 97, 131

[56] References Cited

U.S. PATENT DOCUMENTS

| | | | |
|---|---|---|---|
| 4,630,187 | 12/1986 | Henze | 323/285 |
| 4,678,984 | 7/1987 | Henze | 323/283 |
| 4,816,740 | 3/1989 | Maier | 323/285 |
| 4,885,674 | 12/1989 | Varga et al. | 323/285 |
| 5,077,652 | 12/1991 | Faley | 363/97 |
| 5,138,250 | 8/1992 | Capel | 323/283 |
| 5,177,676 | 1/1993 | Inam et al. | 323/285 |

OTHER PUBLICATIONS

R. Redl and N. O. Sokal, "Overload Protection Methods for Switching-Mode DC/DC Converters: Classification, Analysis, and Improvements," PESC '87 Record [IEEE Catalog No. 87CH2459-6], pp. 107–118, Dec. 1987.

*Primary Examiner*—Jeffrey L. Sterrett
*Attorney, Agent, or Firm*—William E. Hein

[57] ABSTRACT

A primary side controller for regulated power converters may be implemented as a monolithic integrated circuit in which fewer pins are required as compared to the prior art 3842 controller. The present controller includes a current limit protection function having an extended time period over which a predetermined current value is reached.

2 Claims, 2 Drawing Sheets

PRIMARY SIDE CONTROLLER FOR REGULATED POWER CONVERTERS

BACKGROUND AND SUMMARY OF THE INVENTION

This invention relates generally to regulated power converters and more particularly to a power controller employed therein. Various ways of performing both power conversion and regulation in regulated power converters are known in the prior art. Switch-mode operation is a common power conversion technique. Pulse width modulation (PWM) is commonly used to accomplish regulation in switch-mode power converters. The device(s) which use the regulation information to control switching of the power device(s) is known as a power controller. One popular prior art power controller method is known as current-mode control. In this control method, current in the converter is monitored and regulation information is used to control the level of current at which the power device(s) will be turned off during a switching period.

A commonly used current-mode power controller is known in the prior art as the 3842 controller. It is available in an eight-pin package, with the following pin functions and a notation of whether a particular pin represents an input or an output:

PIN 1—Compensation (Output)
PIN 2—Feedback (Input)
PIN 3—Current Sense (Input)
PIN 4—Oscillator Timing (Input)
PIN 5—Ground
PIN 6—Driver (Output)
PIN 7—Supply Rail (Input)
PIN 8—Voltage Reference (Output)

FIG. 1 illustrates an example of how a prior art 3842 controller may be incorporated in an application circuit. Only the opto-transistor portion of the opto-coupler is shown, with the opto-LED presumably being driven by an error signal. A toggle latch is shown in dotted lines to represent an option which, when implemented, limits the duty cycle to below 50%. The controller is known as the 3844 controller when this option is included, but is otherwise equivalent to the 3842 controller. In the discussion that follows, the term 3842 refers to either the 3842 controller or the 3844 controller, unless otherwise noted.

One disadvantage of the 3842 controller in the illustrated application is that the operational amplifier that is built into the 3842 is only used as an inverting low gain (i.e. 1-5) amplifier, with the noise filtering capacitor probably a practical necessity. The 3842 seems more suited to regulating a non-isolated output where the operational amplifier performs a useful purpose.

The reference pin of the 3842 serves no purpose here other than to supply charge current through the timing resistor RT to the timing capacitor CT, which is not a very efficient utilization. Slope compensation, required to prevent subharmonic oscillation if the duty ratio is greater than 50%, is not implemented in the 3842 controller circuit application of FIG. 1. Slope compensation would require several external components.

An undesirable condition commonly found in current-mode controlled power converters, especially when operating at higher switching frequencies, is that the output current may substantially exceed the commanded value under the condition of a short circuited output. In the prior art circuit of FIG. 1, the commanded value is proportional to the controlling voltage at pin 1. A voltage signal proportional to the current signal being controlled is applied at pin 3. In the event of overload or shorted output of the converter, in each switching cycle the current signal reaches the value corresponding to the maximum controlling voltage and initiates the turn-off of the main power switch of the converter. Due to circuit delays, both internal and external, the turn-off of the main power switch does not coincide exactly with the instant the current signal exceeds the controlling level; rather, it is delayed by typically several hundred nonoseconds. The ratio of that delay time and the clock period sets an effective limit for the achievable minimum duty ratio of the power switch of the converter. Even if the current waveform overshoots the controlling level every switching cycle, the 3842 is not able to further reduce the duty ratio and, therefore, is not able to bring the current down to the commanded level. The result is that the output current of the converter rises substantially above the desired maximum level, the shape of the output voltage-current characteristic and the exact value of the short-circuit current depending on a fortuitous combination of parasitic circuit parameters: winding resistances and leakage inductance of the transformer, external and internal time delays, voltage drops in the power switch and the output transistor. The end result is excess heat dissipation and possible failure of the converter. (The phenomenon of the output current exceeding its commanded value at heavy overload or short-circuited output is called "short-circuit current runaway." A detailed discussion and mathematical analysis of the short-circuit current runaway can be found in the paper by R. Redl and N.O. Sokal, "Overload protection methods for switching-mode dc/dc converters: classification, analysis, and improvements, " PESC '87 Record [IEEE Catalog no. 87CH2459-6], pp. 107–118).

It is therefore a principal object of the present invention to provide a primary side controller implemented as a monolithic integrated circuit that eliminates the disadvantages of the prior art 3842 controller described above.

It is a further object of the present invention to provide a primary side controller implemented as a monolithic integrated circuit in which fewer pins are required to provide a similar or improved function over that provided by the prior art 3842 controller described above.

It is a further object of the present invention to provide a primary side controller including a current limit protection function having an extended time period over which a predetermined current value is reached.

DETAILED DESCRIPTION OF THE PREFERRED EMBODIMENT

Figure 2:
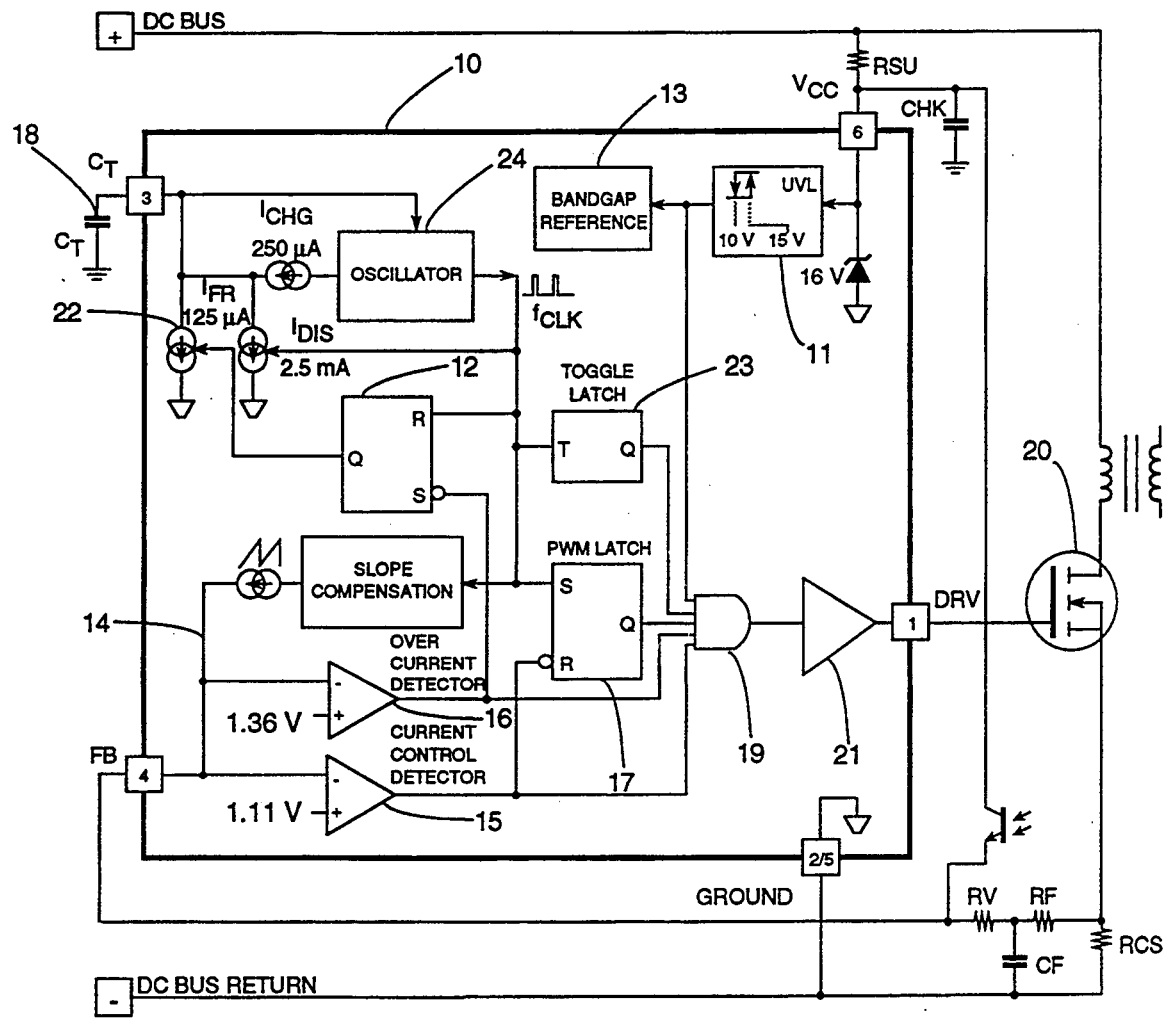
FIG. 2 is a detailed cicuit diagram of a primary side controller circuit in accordance with the preferred embodiment of the present invention, along with an application circuit in which the primary side controller may be employed.

Referring now to FIG. 2, there is shown a detailed circuit diagram of a primary side controller 10, in accordance with the present invention, that is employed for controlling a power converter via pulse width modulation (PWM). The primary side controller 10 may or may not include a toggle option 23, as in the prior art 3842 controller. Several fundamental differences exist between the prior art 3842 controller and the primary side controller 10 of the present invention. The primary side controller 10 eliminates the operational amplifier contained within the 3842 controller, thereby eliminating one pin. The primary side controller 10 does not include a reference output pin, thereby eliminating another pin. The feedback and current sense functions have been combined as a single input pin 4, thereby eliminating yet another pin. The primary side controller 10 includes current ramp slope compensation that is adjustable in magnitude by the user through the same pin 4 that also controls over-current protection in combination with a frequency reduction circuit.

Figure 1:
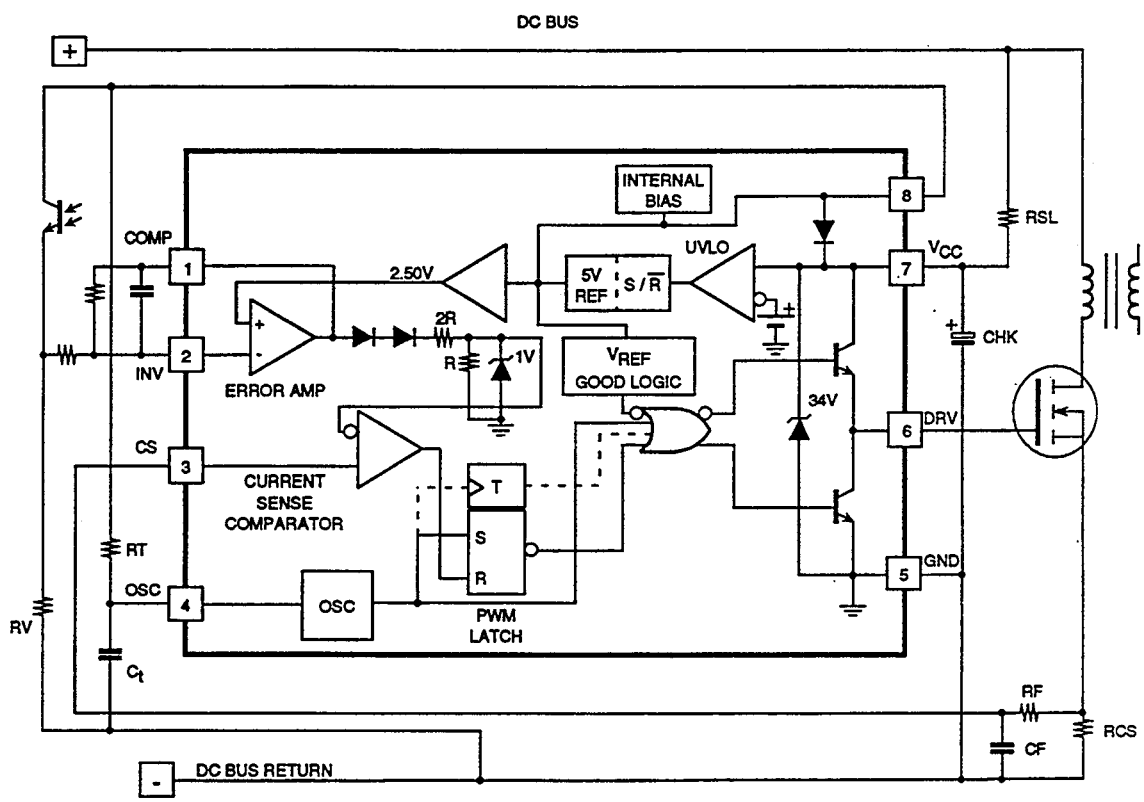
FIG. 1 is a schematic diagram illustrating a prior art 3842 controller and the external circuitry employed in a typical application.

In its simplest form, the primary side controller 10 of the present invention is implemented in a six-pin integrated circuit package. The pin numbers and associated functions are as follows:

PIN 1—Driver (output)
PIN 2—Ground
PIN 3—Timing Capacitor
PIN 4—Feedback/Current Sense/Ramp Slope Compensation/ Over-Current Protection
PIN 5—Ground
PIN 6—Vcc Supply Voltage In the application circuit illustrated in FIG. 2, which is similar to the prior art 3842 application of FIG. 1, an under voltage lockout (UVL) 11 prevents operation of primary side controller 10 until supply voltage Vcc has reached a level of 15 volts. At that point a bandgap reference 13 is activated by UVL 11 to enable the remainder of the circuitry comprising primary side controller 10. Primary side controller 10 implements current-mode control through resistive sensing of the current flowing in a switch device 20. The novel concept is shown of summing an error signal and a current sense signal into a single junction at pin 4. The primary side controller 10 also sums a current ramp signal 14 into the same junction to accomplish slope compensation. This net feedback signal is compared, by a current control detector 15, to a reference voltage that is nominally 1.11 volts. When the net feedback signal reaches the 1.11-volt threshold, it is processed by a PWM latch 17, an AND gate 19, and an output drive buffer 21 to terminate a drive pulse DRV supplied at pin 1 for application to switch device 20. The net feedback signal at pin 4 is also compared, by an over current detector 16, to a 1.36-volt reference. If this threshold is ever reached, indicating a current substantially in excess of the controlling voltage, a frequency reduction latch 12 is triggered for the remainder of the switching period. Frequency reduction latch 12 draws current away from an external timing capacitor 18 that is sourced out of pin 3 of the primary side controller 10. This action serves to lengthen the switching period, which is key to resolving the excessive current condition. A toggle latch 23 may be optionally provided to limit the duty cycle of drive pulse DRV to 50%.

The effect of lengthening the switching period is equivalent to reducing the minimum duty ratio. The reduced duty ratio leads to a proportional reduction in the current limit value and in the power dissipation under current limit conditions. When compared to the prior art 3842 circuit of FIG. 1, it will be understood that the power dissipation in power device 20 under current limit conditions has been reduced by a factor of two. If a current limit fault occurs late in an output cycle, the reduction in dissipated power is less than if the fault occurs early in an output cycle.

The frequency reduction circuit through which the current limit function is implemented comprises over current detector 16, frequency reduction latch 12, and a 125 uA current source 22, as illustrated in FIG. 2. Regardless of the point in a cycle of drive pulse DRV at which a fault is sensed by the over-current detector 16, the frequency reduction latch 12 causes the 125 uA current source 22 to draw a portion of the 250 uA charging current provided by an oscillator 24, thereby extending the period of the cycle of drive pulse DRV in which the fault occurs. If the fault occurs early in the cycle, the frequency is reduced by nearly a factor of two. If the fault occurs later in the cycle, only a small reduction in frequency results. The frequency latch 12 is reset by a clock signal fCLK provided by oscillator 24, and the primary side controller 10 returns to normal operation following elimination of the fault.

We claim:

1. A controller for controlling a drive voltage pulse applied to a power switching device in a regulated power converter, the controller comprising:
   a single summing junction for receiving a net feedback signal comprising an error signal, a current sense signal, and a current ramp signal;
   first comparator means connected to the single summing junction for comparing the net feedback signal to a first reference voltage and for initiating termination of the drive voltage pulse when the net feedback signal rises to the first reference voltage; and
   a frequency reduction circuit, including second comparator means connected to the single summing junction for comparing the net feedback signal to a second reference voltage to sense an over current condition when the net feedback signal rises to the second reference voltage, the frequency reduction circuit being responsive to the second comparator means when an over current condition has been sensed, for variably lengthening the period of the drive voltage pulse to protect the power switching device from the over current condition.

2. A controller as in claim 1 further comprising:
   oscillator means for supplying a clock signal, the oscillator means also comprising a charge current source for an external timing capacitor;
   the frequency reduction circuit further comprising a second current source coupled to the oscillator means; and for drawing a portion of the charging current supplied by the oscillator means away from the timing capacitor; and
   a frequency reduction latch coupled to the second comparator means, the oscillator means, and the second current source, the frequency reduction latch being responsive to sensing of an over current condition by the second comparator means for causing the second current source to draw a portion of the charging current supplied by the oscillator means away from the external timing capacitor to thereby lengthen the period of the drive voltage pulse.

* * * * *